United States Patent [19]
Re

[11] Patent Number: 4,809,386
[45] Date of Patent: Mar. 7, 1989

[54] COMBINED MANUAL IMPLEMENT FOR WINDOW SNOW REMOVAL, ICE SCRAPING, WASHING AND DRYING, FOR VEHICLES IN GENERAL

[75] Inventor: Uberto Re, RHO (Mi), Italy
[73] Assignee: FRATELLI Re S.p.A., Milan, Italy
[21] Appl. No.: 122,278
[22] Filed: Nov. 18, 1987

[30] Foreign Application Priority Data

Aug. 4, 1987 [IT] Italy ................................ 21583 A/87

[51] Int. Cl.$^4$ .......................... A47L 1/08; A47L 23/04
[52] U.S. Cl. ........................................ 15/105; 15/111;
15/114; 15/117; 15/118; 15/121
[58] Field of Search ................ 15/105, 106, 111, 114,
15/117, 118, 113, 121

[56] References Cited

U.S. PATENT DOCUMENTS

| | | | |
|---|---|---|---|
| 3,017,649 | 1/1962 | Racicot | 15/117 X |
| 3,110,052 | 11/1963 | Whitman | 15/117 |
| 3,968,535 | 7/1976 | Nichols | 15/105 |
| 4,240,176 | 12/1980 | Farmer | 15/117 X |
| 4,281,433 | 8/1981 | Sendoykas | 15/117 X |

FOREIGN PATENT DOCUMENTS 1508321 11/1967 France ................................. 15/105

Primary Examiner—Harvey C. Hornsby
Assistant Examiner—Stephen F. Gerrity
Attorney, Agent, or Firm—Ladas & Parry

[57] ABSTRACT

A vehicle implement comprising a head carried by a handle, a first seat provided along a longitudinal edge of said head and arranged to receive a rubber strip for drying windows, a second seat provided along the opposing longitudinal edge of said head and arranged to receive, as required a brush for snow removal or a sponge for washing windows and/or other vehicle surfaces, and an ice scraper housed extractably in said head, said first and second seat for receiving said rubber strip and said brush or sponge comprising screws for locking the elments contained in said seats.

7 Claims, 1 Drawing Sheet

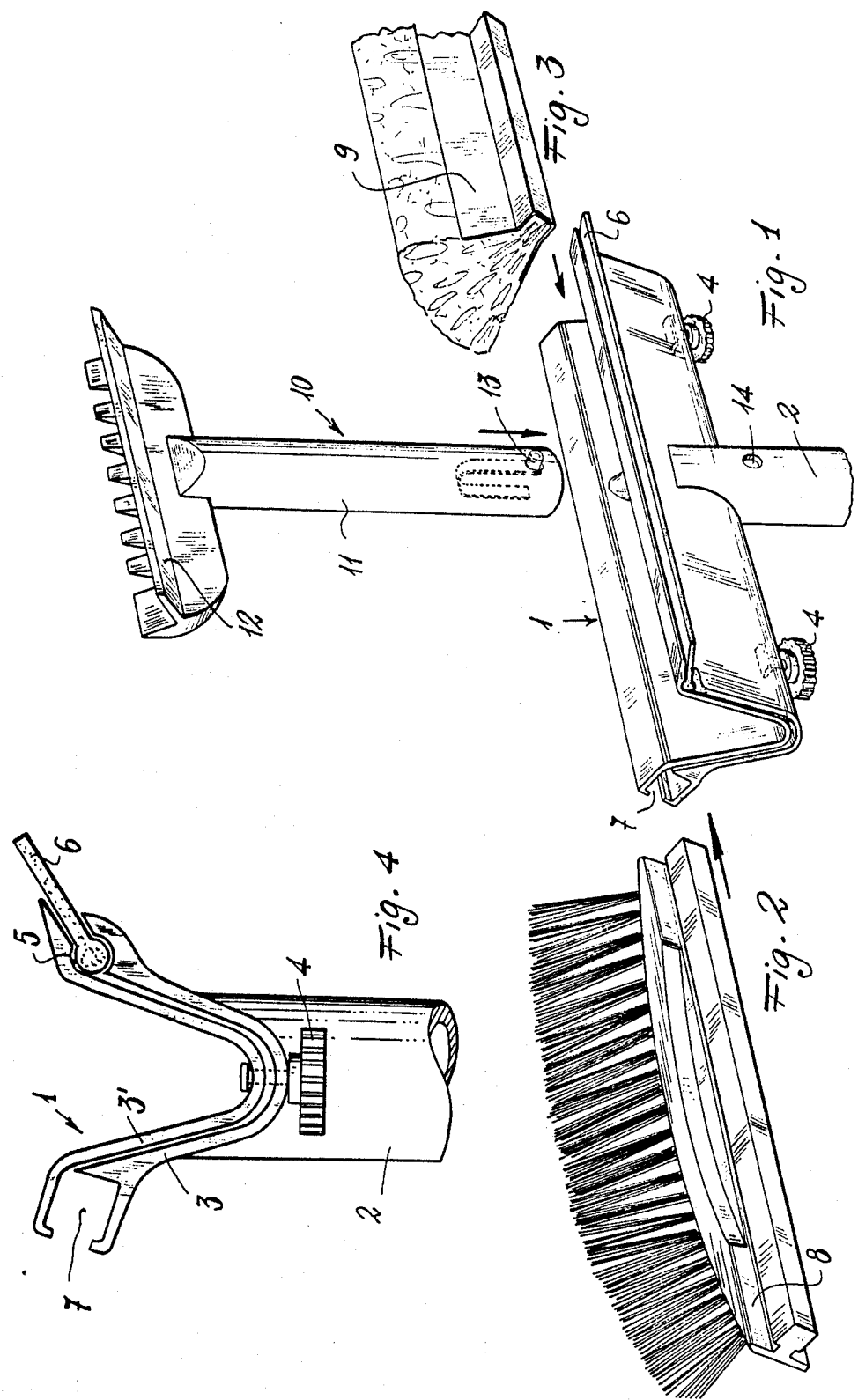

COMBINED MANUAL IMPLEMENT FOR WINDOW SNOW REMOVAL, ICE SCRAPING, WASHING AND DRYING, FOR VEHICLES IN GENERAL

BACKGROUND OF THE INVENTION

The present invention relates to a combined manual implement for window snow removal, ice scraping, washing and drying, for vehicles in general.

Varied means are currently being used for removing snow from a vehicle, and these have to be obtained separately by the driver as they are not normally provided with the vehicle. Again, for scraping ice from windows a suitable scraper also forming a separate implement must be used.

SUMMARY OF THE INVENTION

An object of the present invention is to provide an implement, to be considered as normal equipment of a vehicle or service station, which enables various cleaning operations to be carried out and is of a form which makes it of practical use and of small overall size.

This and further objects of the invention will be apparent to experts of the art from the description given hereinafter.

The combined implement according to the invention is characterized essentially by comprising a head carried by a handle, a first seat provided along a longitudinal edge of said head and arranged to receive a rubber strip for drying windows, a second seat provided along the opposing longitudinal edge of said head and arranged to receive, as required, a brush for snow removal or a sponge for washing windows and/or other vehicle surfaces, and an ice scraper housed extractably in said head, said first and second seat for receiving said rubber strip and said brush or sponge comprising means for locking the elements contained in said seats. According to a further characteristic, the head is of U-shape and the scraper is housed in the cavity of said U with the handgrip penetrating into the handle carrying said head, means associated with said handgrip and with said handle enabling said scraper to be extracted and locked when in its extracted position, and also to be totally removed for its use independent of the rest of the implement.

The implement is illustrated by way of example in the figures of the accompanying drawing.

BRIEF DESCRIPTION OF THE DRAWING

FIG. 1 is a view of the head with the scraper completely extracted;

FIGS. 2 and 3 are perspective views of the brush and sponge respectively; and

FIG. 4 is an enlarged side view of the head.

DESCRIPTION OF THE PREFERRED EMBODIMENT

With reference to said figures, the head 1 is located at the end of a hollow handle 2, which is advantageously of telescopic type. The head 1 consists of 2 U-shaped elements 3, 3' (FIG. 4), the element 3' being contained in the cavity defined by the element 3.

As can be clearly seen from the Figures, the elements 3, 3' are clamped together by the action of screws 4, and the longitudinal edges of said elements define a first seat 5 for housing a rubber strip 6 for drying windows and a second seat 7 for housing, as required, a snow removal brush 8 or a sponge 9 for washing windows and/or other vehicle surfaces.

The brush 8 and sponge 9 are inserted into the seat 7 with the screws 4 slackened, and are then locked in position by tightening said screws, the tightening operation causing the two elements 3, 3' to approach each other.

The scraper 10 comprises a handgrip 11, on the top of which there is located the scraper head 12. As can be seen from FIG. 1, the handgrip 11 of the scraper 10 penetrates into the hollow handle 2 so that when the scraper is in its non-working position, the head 12 is contained in the cavity defined by the U-shaped elements 3, 3'.

As elastic pushbutton 13 provided on the handgrip 11 cooperates with holes 14 (only one shown in FIG. 1) provided in the handle 2 so as to lock said scraper 10 in its extracted or working position and in its retracted or non-working position, and also to enable the scraper to be completely removed for use independently of the rest of the implement.

Fitting the scraper to the implement head 1 and providing a telescopic handle enable ice to be also scraped from windows located at a considerable height from the ground, such as in the case of coaches and trailer trucks. This also applies to window drying by means of the rubber strip 6.

The facility for replacing the brush 8 with a sponge 9 is extremely useful, and gives the implement considerable advantages.

What I claim is:

1. A windshield cleaning tool comprised of:
a generally hollow handle;
a head associated with said generally hollow handle;
an ice scraper comprised of an ice scraping head and
   a handle attached to said ice scraping head, whereby said handle of said ice scraper
   (1) fits removably within said generally hollow handle, and said ice scraping head fits removably within said head associated with said generally hollow handle such that both said ice scraper and said generally hollow handle with said head associated therewith can be used independently of each other when separated,
   (2) fits partially within and secured within said generally hollow handle so that said ice scraper may be used as part of said cleaning tool, and
   (3) fits fully within said generally hollow handle so that said ice scraping head lies within said head associated with said generally hollow handle, the ice scraper being in this position set for storage within said generally hollow handle and the head associated therewith.

2. The windshield cleaning tool of claim 1 wherein said generally hollow handle includes connecting means and wherein said ice scraper handle includes engagement means, said engagement means and said connecting means interacting with one another such that said ice scraper handle may be held within said generally hollow handle for use with said cleaning tool and may be held within said generally hollow handle for storage therein.

3. The windshield cleaning tool of claim 2 wherein said head associated with said generally hollow handle is comprised of: a first and a second generally U-shaped element, the first U-shaped element being receivable within said second U-shaped element; and securing means connecting said two U-shaped elements adjustably together such that said U-shaped elements may receive and hold cleaning means therebetween.

4. The tool of claim 3 wherein said U-shaped elements define lips on their free edges, said lips on said first U-shaped element being separable from said lips on said second U-shaped element by adjustment of said securing means such that cleaning means may be held between said lips.

5. The tool of claim 4 wherein said cleaning means receivable by said lips is a brush.

6. The tool of claim 4 wherein one of said cleaning means receivable by said lips is a rubber strip for facilitating drying of a surface.

7. The tool of claim 4 wherein one of said cleaning means receivable by said lips is a sponge.

* * * * *